(12) United States Patent
Lee

(10) Patent No.: US 12,331,818 B2
(45) Date of Patent: Jun. 17, 2025

(54) STAMPED METAL DIFFERENTIAL FOR A MOTOR VEHICLE DRIVETRAIN

(71) Applicant: Schaeffler Technologies AG & Co. KG, Herzogenaurach (DE)

(72) Inventor: Brian Lee, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/440,958

(22) Filed: Feb. 13, 2024

(65) Prior Publication Data

US 2025/0035197 A1    Jan. 30, 2025

Related U.S. Application Data

(60) Provisional application No. 63/528,515, filed on Jul. 24, 2023.

(51) Int. Cl.
| | |
|---|---|
| *F16H 48/08* | (2006.01) |
| *F16H 48/20* | (2012.01) |
| *F16H 48/40* | (2012.01) |
| *F16H 57/023* | (2012.01) |
| *F16H 48/34* | (2012.01) |
| *F16H 48/38* | (2012.01) |

(52) U.S. Cl.
CPC ............ *F16H 48/08* (2013.01); *F16H 48/20* (2013.01); *F16H 48/40* (2013.01); *F16H 57/023* (2013.01); *F16H 2048/085* (2013.01); *F16H 2048/346* (2013.01); *F16H 2048/382* (2013.01)

(58) Field of Classification Search
CPC .............. F16H 48/08; F16H 2048/085; F16H 2048/382; F16H 48/20; F16H 48/22; F16H 48/24; F16H 2048/346; F16H 48/34; F16H 48/40; F16H 57/023
USPC ................................ 475/230, 231, 240, 241
See application file for complete search history.

(56) References Cited

U.S. PATENT DOCUMENTS

| | | | | |
|---|---|---|---|---|
| 1,445,865 | A | * 2/1923 | Alden | F16H 48/08 475/228 |
| 5,584,777 | A | * 12/1996 | Sander | F16H 57/08 74/606 R |

(Continued)

*Primary Examiner* — Roger L Pang
(74) *Attorney, Agent, or Firm* — Davidson Kappel LLC

(57) ABSTRACT

A differential for a motor vehicle drivetrain includes a ring gear configured for receiving a power input; a first side gear on a first side of the differential configured for being drivingly connected to the first axle to transmit power to the first axle for driving a first wheel of the motor vehicle drivetrain; a second side gear on a second side of the differential configured for being drivingly connected to the second axle to transmit power to the first axle for driving a second wheel of the motor vehicle drivetrain; support pins non-rotatably fixed to the ring gear; and spider gears rotatably mounted on the support pins and positioned between the first side gear and the second side gear. Each of the spider gears intermeshes with both the first side gear and the second side gear to transmit power from the support pins to the first side gear and the second side gear. The differential also includes a carrier formed by stamped plates non-rotatably fixed to the ring gear and configured for transmitting power from the ring gear to the support pins.

18 Claims, 9 Drawing Sheets

(56) References Cited

U.S. PATENT DOCUMENTS

| | | | | |
|---|---|---|---|---|
| 6,176,152 B1* | 1/2001 | Victoria | ............... | F16H 48/08 |
| | | | | 475/230 |
| 7,264,569 B2 | 9/2007 | Fox | | |
| 2001/0053729 A1* | 12/2001 | Janiszewski | ........... | F16H 48/08 |
| | | | | 475/160 |
| 2009/0137357 A1* | 5/2009 | Meier | ................ | B21D 53/90 |
| | | | | 475/230 |
| 2014/0121055 A1* | 5/2014 | Forrest | ................ | F16H 48/24 |
| | | | | 475/233 |
| 2022/0090667 A1* | 3/2022 | Kisielewicz | ........... | F16H 48/40 |

* cited by examiner

STAMPED METAL DIFFERENTIAL FOR A MOTOR VEHICLE DRIVETRAIN

TECHNICAL FIELD

The present disclosure relates generally to motor vehicle drivetrains, and more specifically to differentials for motor vehicle drivetrains.

BACKGROUND

A typical differential is made with either a casting housing or two forged housings bolted together.

SUMMARY

A differential for a motor vehicle drivetrain includes a ring gear configured for receiving a power input; a first side gear on a first side of the differential configured for being drivingly connected to the first axle to transmit power to the first axle for driving a first wheel of the motor vehicle drivetrain; a second side gear on a second side of the differential configured for being drivingly connected to the second axle to transmit power to the first axle for driving a second wheel of the motor vehicle drivetrain; support pins non-rotatably fixed to the ring gear; and spider gears rotatably mounted on the support pins and positioned between the first side gear and the second side gear. Each of the spider gears intermeshes with both the first side gear and the second side gear to transmit power from the support pins to the first side gear and the second side gear. The differential also includes a carrier formed by stamped plates non-rotatably fixed to the ring gear and configured for transmitting power from the ring gear to the support pins.

In examples, the plates include a first plate surrounding the first side gear and a second plate surrounding the second side gear.

In examples, the plates include a third plate sandwiched axially between the first plate and the second plate.

In examples, each of the first, second and third plates includes a radially outer section bolted to the ring gear.

In examples, each of the first and third plates includes an axially extending section radially inward of the radially outer sections, the axially extending sections extending from the radially outer sections in a direction away from the second side gear.

In examples, the axially extending section of the first plate extends axially further away from the second side gear than the axially extending section of the third plate.

In examples, at least one of the plates includes radially extending slots formed therein, each of the support pins extending into a respective one of the slots.

In examples, at least the second plate includes the radially extending slots and further includes radially extending notches, each of the radially extending notches being directly radially outside of a respective one of the radially extending slots.

In examples, differential further includes a locking plate for non-rotatably locking the spider gears with respect to the plates and an actuator moving the locking plate between a locking orientation and a non-locking orientation, the plates including a first plate supporting the actuator, the locking plate being housed within the first plate.

In examples, the actuator includes an electric motor and actuatable pins movable by the electric motor to move the locking part between the locking orientation and the non-locking orientation, the first plate including a first radially extending annular section, the actuatable pins being axially movable in holes in the first radially extending annular section.

In examples, the first plate includes a first annular hub radially inward of the first radially extending annular section, the first annular hub configured for receiving the first axle, the electric motor being provided on an outer circumferential surface of the first annular hub.

In examples, the plates include a second plate extending from the ring gear axially past the second side gear and then radially inward toward the center axis, and a third plate axially between the first plate and the second plate.

In examples, the third plate includes a radially outer section fixed to the ring gear by bolt passing through the third plate, the third plate further including an axially extending section from an inner end of the radially outer section of the third plate toward the electric motor, the locking plate being axially between an axial end of the axially extending section of the third plate and the first radially extending annular section.

In examples, each of the stamped plates has a thickness that varies by less than or equal to 20%.

A method of constructing a differential transmission for a motor vehicle drivetrain is also provided that includes stamping plates; and non-rotatably fixing the stamped plates to a ring gear to form a carrier. The stamped plates encasing a first side gear, a second side gear, support pins and spider gears.

In examples, the stamping of the plates includes stamping a first plate and a second plate, the first and second plates encasing the first side gear, the second side gear, the support pins and the spider gears.

In examples, the stamping of the plates includes stamping a third plate, the non-rotatably fixing of the stamped plates to the ring gear to form the carrier includes sandwiching a radially outer section of the third plate between a radially outer section of the first plate and a radially outer section of the second plate and passing bolts through all of the radially outer sections and the ring gear, each of the first and third plates including an axially extending section radially inward of the radially outer sections of the first and third plates, the axially extending sections extending from the radially outer sections of the first and third plates in a direction away from the second side gear, the axially extending section of the third plate being directly radially outside of the second side gear.

In examples, the method further includes installing the spider gears on the support pins; and then sequentially stacking the second side gear, the spider gears and the first side gear within the first plate; and then placing the second plate on top of the first side gear; and then non-rotatably fixing the plates to the ring gear.

In examples, the stamping of the second plate includes machining radially extending notches into an outer circumference of the second plate and then stamping slots into the second plate directly radially inward of the radially extending notches, the method further including installing each of the support pins in a respective one of the slots.

In examples, the placing of the second plate on top of the first side gear includes placing a third plate on top of the support and then placing the first plate on top of the third plate.

BRIEF DESCRIPTION OF THE DRAWINGS

The present disclosure is described below by reference to the following drawings, in which.

DETAILED DESCRIPTION

Figure 2:
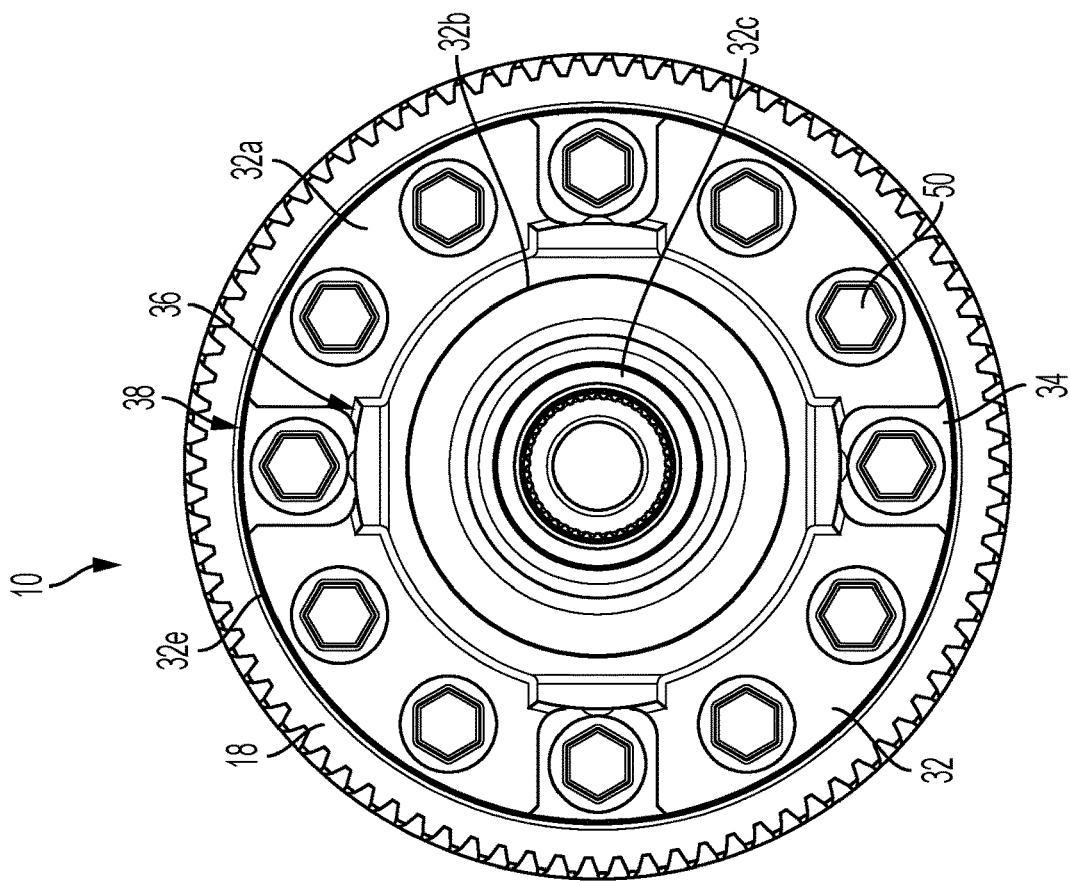
FIG. 2 shows a first axially facing view of the differential shown in FIG. 1.
Figure 1:
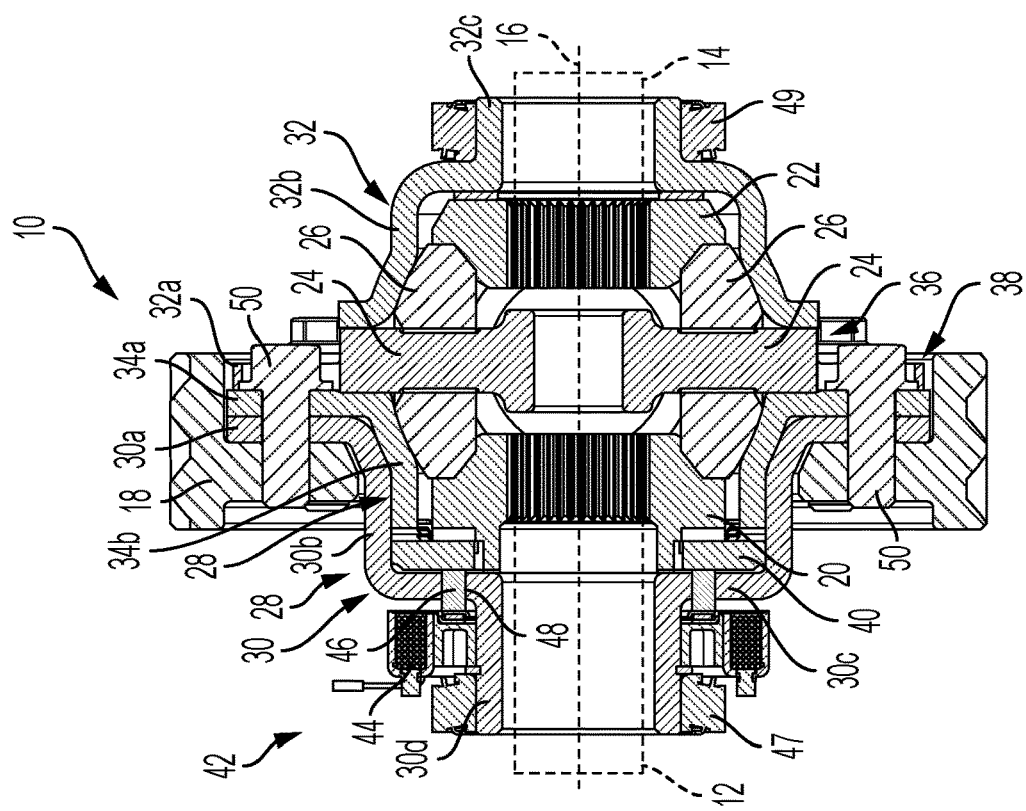
FIG. 1 shows a cross-sectional radially facing view of a differential for motor vehicle drivetrain in accordance with a first example of the present disclosure.
Figure 4:
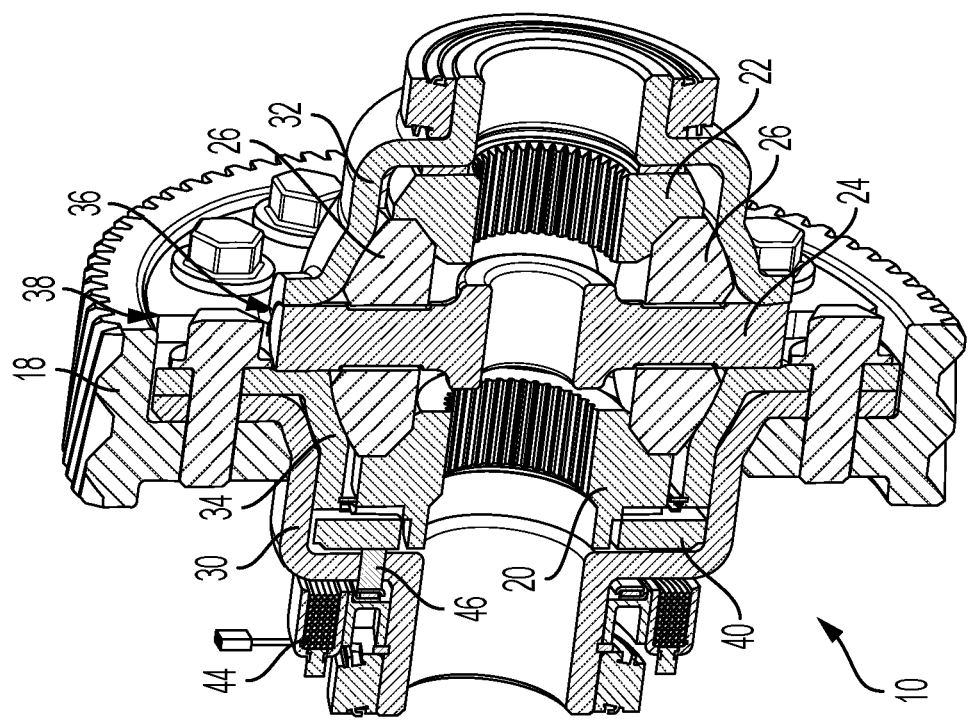
FIGS. 3 and 4 show a perspective cross-sectional radially facing views of the differential shown in FIG. 1.
Figure 3:
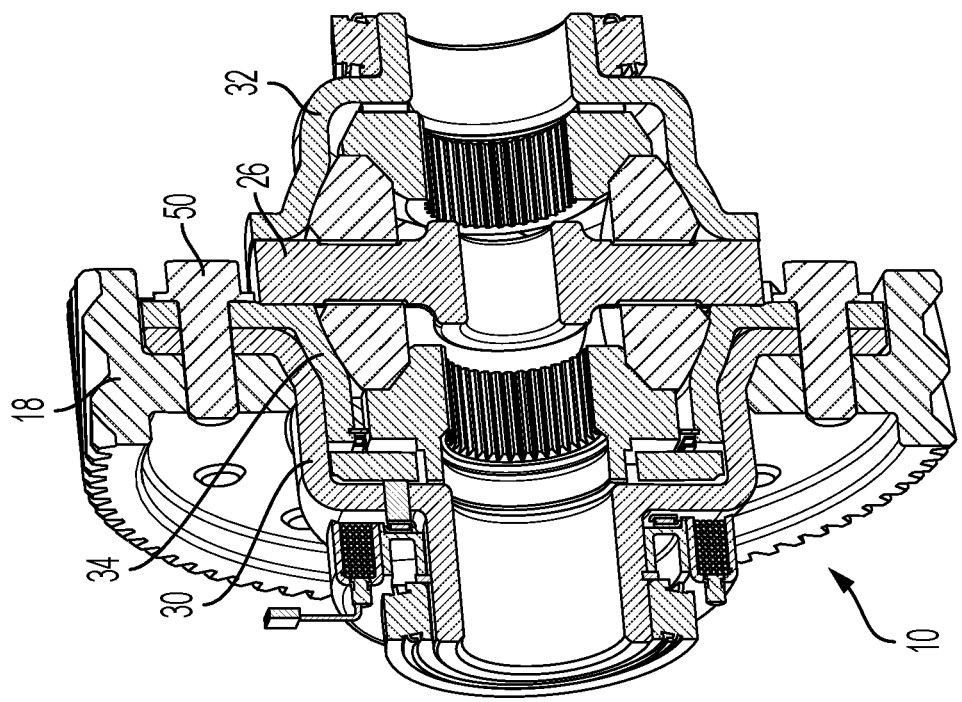
Figure 5:
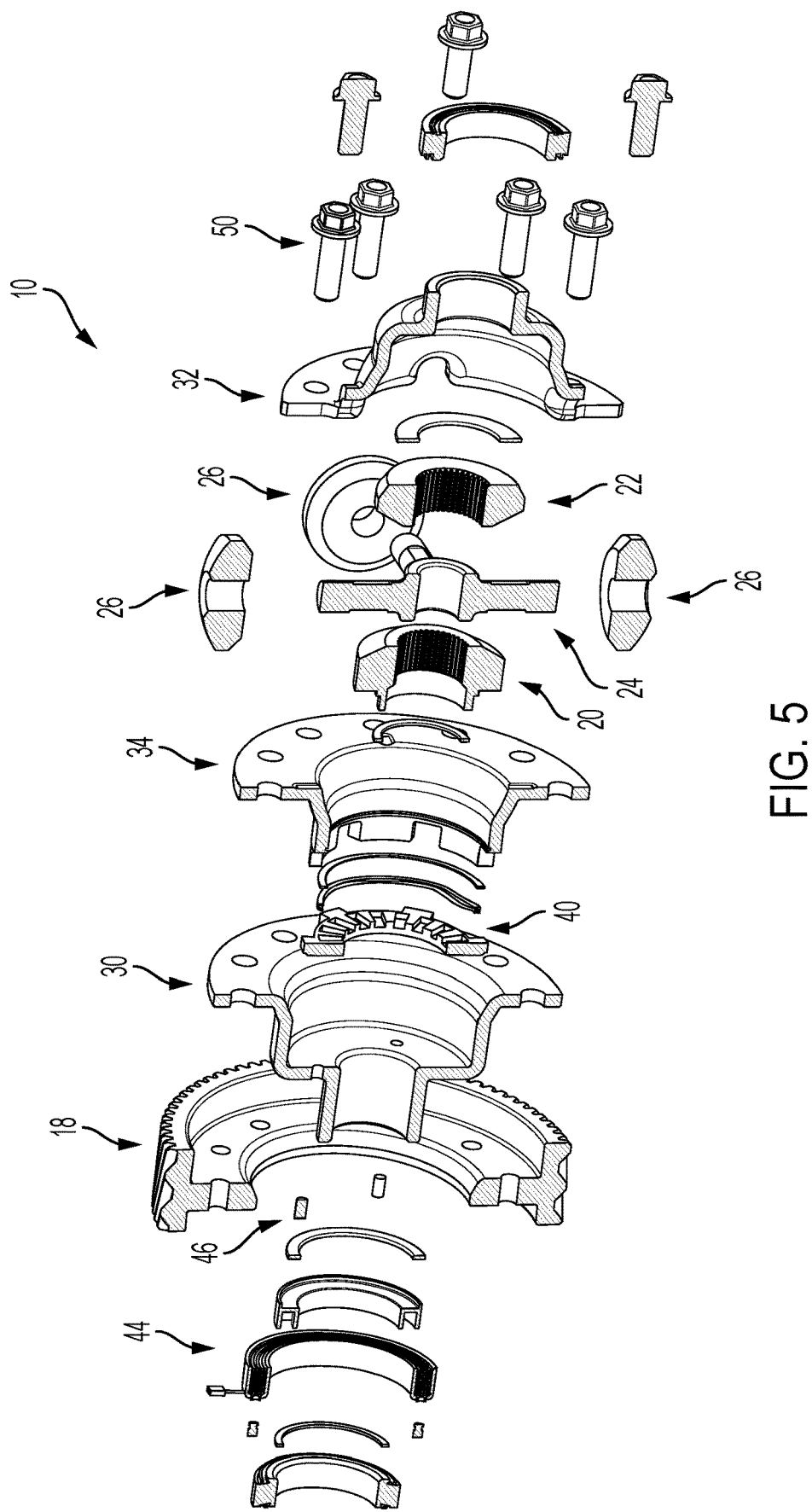
FIG. 5 shows an exploded cross-sectional radially facing view of the differential shown in FIG. 1.
Figure 7:
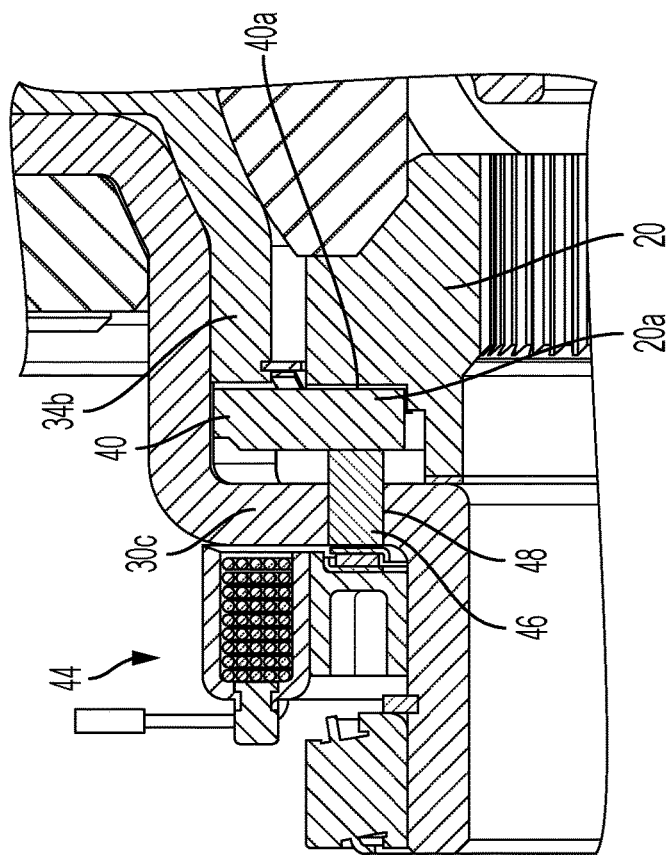
FIG. 7 shows an enlarged cross-sectional radially facing view of a portion of the differential shown in FIG. 1, illustrating the actuator in a locking orientation.
Figure 6:
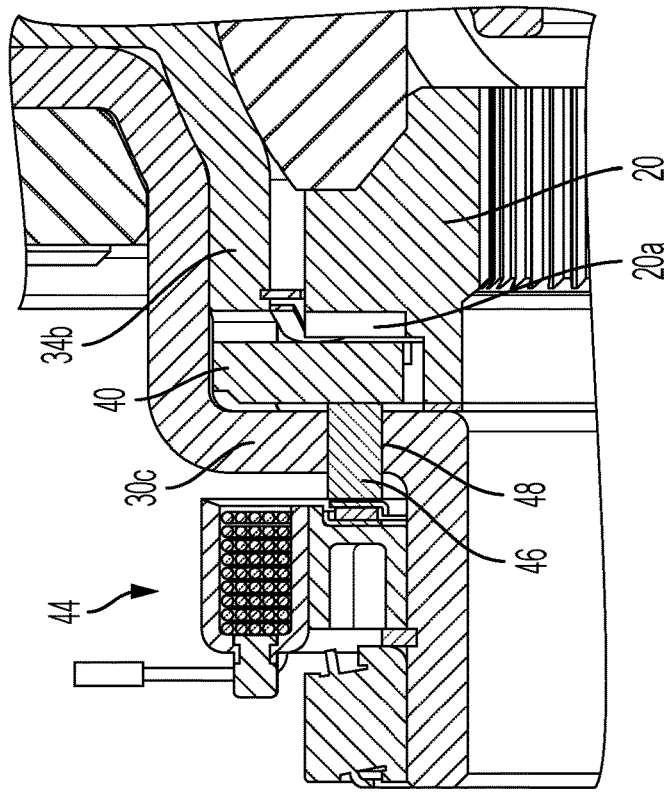
FIG. 6 shows an enlarged cross-sectional radially facing view of a portion of the differential shown in FIG. 1, illustrating an actuator in a non-locking orientation.

FIGS. 1 to 10c show different views of a differential 10 for motor vehicle drivetrain in accordance with a first example of the present disclosure. Differential 10 is configured for driving a first axle 12 and a second axle 14 about a center axis 16 (FIG. 1) and for allowing the first axle 12 and the second axle to rotate about the center axis 16 at different speeds.

The differential 10 includes a ring gear 18 configured for receiving a power input from an internal combustion engine and/or an electric motor and transmitted through the driveshaft to a pinion gear, which is drivingly connected to the ring gear 18. The differential 10 further includes a first side gear 20 on a first side of the differential 10 configured for being drivingly connected to the first axle 12 to transmit power to the first axle 12 for driving a first wheel of the motor vehicle drivetrain. Ring gear 18 defines the outermost circumference of differential 10.

The differential 10 also includes a second side gear 22 on a second side of the differential 10 configured for being drivingly connected to the second axle 14 to transmit power to the first axle 12 for driving a second wheel of the motor vehicle drivetrain. Spider gears 26 are rotatably mounted on the support pins 24, which are non-rotatably fixed to the ring gear 18, and are positioned between the first side gear 20 and the second side gear 22. Each of the spider gears 26 intermeshes with both the first side gear 20 and the second side gear 22 to transmit power from the support pins 24 to the first side gear 20 and the second side gear 22.

Advantageously, the differential 10 includes a carrier 28 formed by stamped plates 30, 32, 34 non-rotatably fixed to the ring gear 18 and configured for transmitting power from the ring gear 18 to the support pins 24. Each of the stamped plates 30, 32, 34 has a thickness throughout the respective plate 30, 32, 34 that varies by less than or equal to 20%.

The first plate 30 surrounds the first side gear 20 and includes a central borehole receiving the first axle 12 and the second plate 32 surrounds the second side gear 22 and includes a central borehole receiving the second axle 14. The third plate 34 is sandwiched axially between the first plate 30 and the second plate 32. More specifically, each of the first, second and third plates 30, 32, 34 includes a respective radially outer section 30a, 32a, 34a bolted to the ring gear 18. Outer sections 30a, 32a, 34a are held against each other, with section 34a being sandwiched axially between the section 30a and section 32a. Each of the first, second and third plates 30, 32, 34 also includes a respective axially extending section 30b, 32b, 34b radially inward of the radially outer sections 30a, 32a, 34a. The axially extending sections 30b, 34b each extend from the radially outer sections 30a, 34a in a direction away from the second side gear 22. The axially extending section 30b of the first plate 30 extends axially further away from the second side gear 22 than the axially extending section 34b of the third plate 34. The axially extending section 34b of the third plate 34 is directly radially outside of the second side gear 22. The axially extending section 30b of the first plate 30 is directly radially outside of the axially extending section 34b of the third plate 34.

At least one of the plates 30, 32, 34 includes radially extending slots 36 formed therein, and each of the support pins 24 extends into a respective one of the slots 36. In the examples shown, the second plate 32 includes the radially extending slots 36 and further includes radially extending notches 38. Each of the radially extending notches 38 is directly radially outside of a respective one of the radially extending slots 36.

Figure 8:
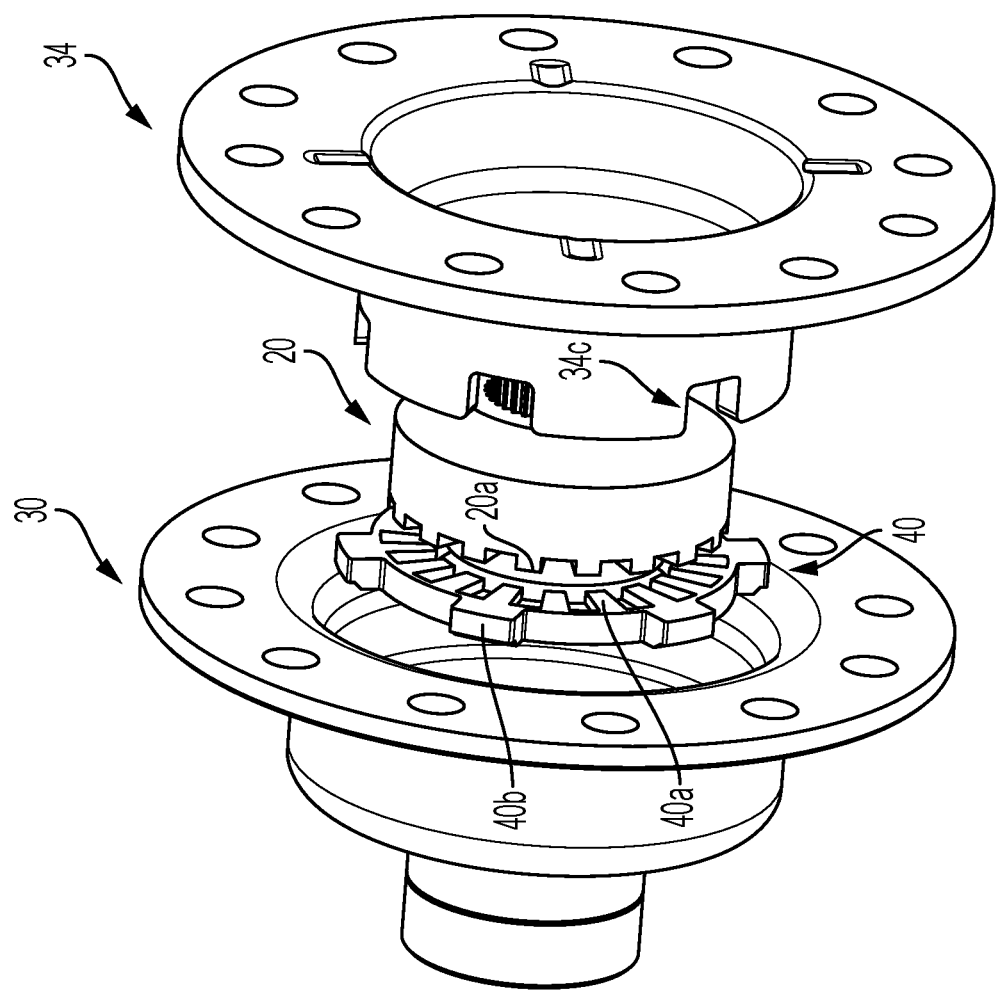
FIG. 8 shows an exploded perspective view of carrier stamped plates, a locking plate and a first side gear of the differential shown in FIG. 1.
Figure 9A:
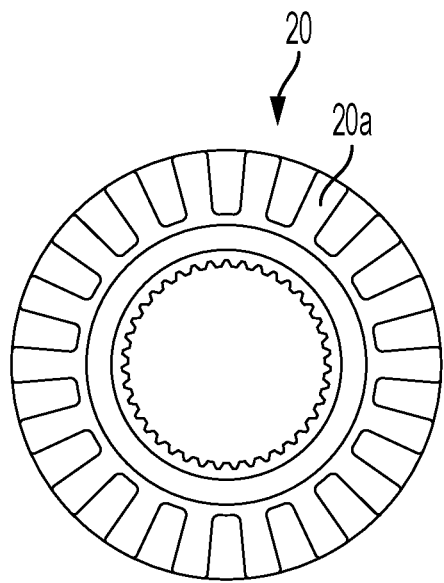
FIGS. 9a to 9c show different views of the first side gear of the differential shown in FIG. 1.
Figure 9B:
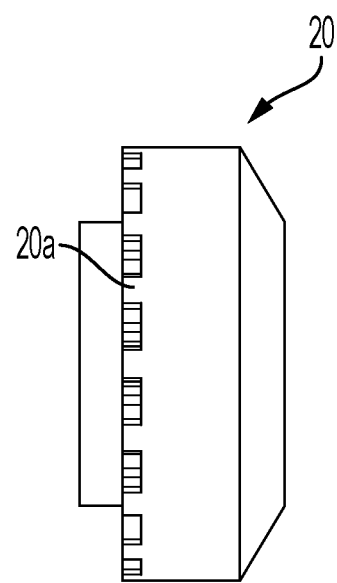
Figure 9C:
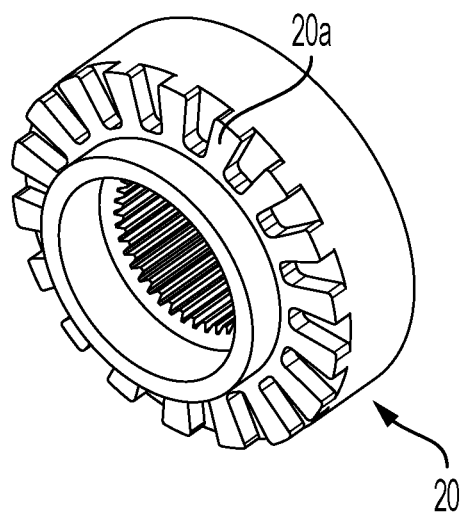
Figure 10A:
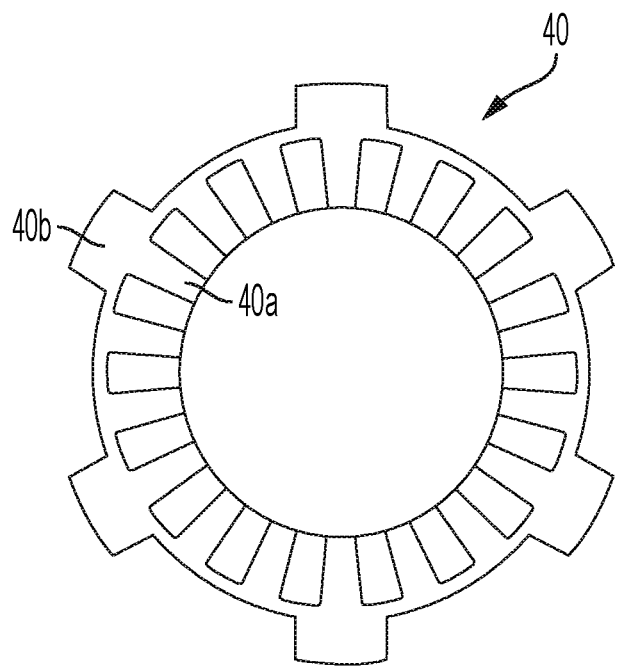
FIGS. 10a to 10c show different views of the locking plate of the differential shown in FIG. 1.
Figure 10B:
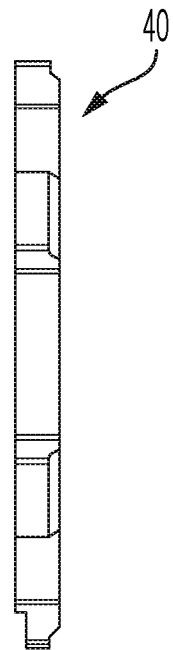
Figure 10C:
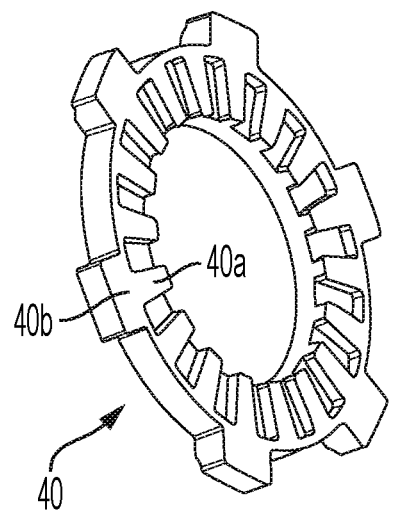

In the example in FIGS. 1 to 10c, as shown in FIGS. 6 to 10c, the differential 10 further includes a locking plate 40 for non-rotatably locking the spider gears 26 with respect to the plates 30, 32, 34 and an actuator 42 moving the locking plate 40 between a locking orientation, in which teeth 40a of locking plate 40 are non-rotatably intermeshed with teeth 20a of first side gear 20, and a non-locking orientation in which teeth of locking plate 40 are disconnected from teeth of first side gear 20. First plate 30 supports the actuator 42, and the locking plate 40 is housed within the first plate 30. As shown in FIG. 8, locking plate 40 includes a plurality of radially extending protrusions 40b defining the outermost circumferential thereof that are axially slidable in axially extending slots 34c formed in axially extending section 34b that guide the axial movement of locking plate 40.

The actuator 42 includes an electric motor 44 and actuatable pins 46 movable by the electric motor 44 to move the locking plate 40 between the locking orientation and the non-locking orientation. The first plate 30 includes a first radially extending annular section 30c, extending radially inward from axially extending section 30b, and the actuatable pins 46 are axially movable in holes 48 in the first radially extending annular section 30c.

The first plate 30 also includes a first annular hub 30d radially inward of the first radially extending annular section 30c. The first annular hub 30d is configured for receiving the first axle 12, and the electric motor 44 is provided on an outer circumferential surface of the first annular hub 30d, along with a bearing 47.

The second plate 32 extends from the ring gear 18 axially past the second side gear 22 and then radially inward toward the center axis 16 to form a second annular hub 32c supporting a bearing 49 on the outer circumferential surface thereof.

The radially outer sections 30a, 32a, 34a of plates 30, 32, 34 are fixed to the ring gear 18 by bolts 50 passing through ring gear 18 and the plates 30, 32, 34. The axially extending section 34b of third plate 34 extends axially from an inner end of the radially outer section 34a of the third plate 34 toward the electric motor 44. The locking plate 40 is axially between an axial end of the axially extending section 34b of the third plate 34 and the first radially extending annular section 30c of the first plate 30.

The present disclosure also provides a method of constructing differential 10. The method includes stamping plates 30, 32, 34 and non-rotatably fixing the stamped plates 30, 32, 34 to ring gear 18 to form carrier 28, with the stamped plates 30, 32, 34 encasing the first side gear 20, the second side gear 22, the support pins 24 and the spider gears 26. More specifically, the first and second plate 30, 32 encases the first side gear 20, the second side gear 22, the support pins 24 and the spider gears 26.

The non-rotatably fixing of the stamped plates 30, 32, 34 to the ring gear 18 to form the carrier 28 including sandwiching the radially outer section 34a of the third plate 34 between the radially outer section 30a of the first plate 30 and the radially outer section 32a of the second plate 32 and passing bolts 50 through all of the radially outer sections 30a, 32a, 34a and the ring gear 18.

The method can further include installing the spider gears 26 on the support pins 24, then sequentially stacking the second side gear 22, the spider gears 26 and the first side gear 20 within the first plate 30, then placing the second plate 32 on top of the first side gear 20, and then non-rotatably fixing the plates 30, 32, 34 to the ring gear 18. The placing of the second plate 32 on top of the first side gear 20 can includes placing a third plate on top of the support and then placing the first plate 30 on top of the third plate.

The stamping of the second plate 32 includes machining radially extending notches 38 into an outer circumference 32d of the second plate 32 and then stamping the slots 36 into the second plate 32 directly radially inward of the radially extending notches 38. Each of the support pins 24 are then installed in a respective one of the slots 36.

Figure 11:
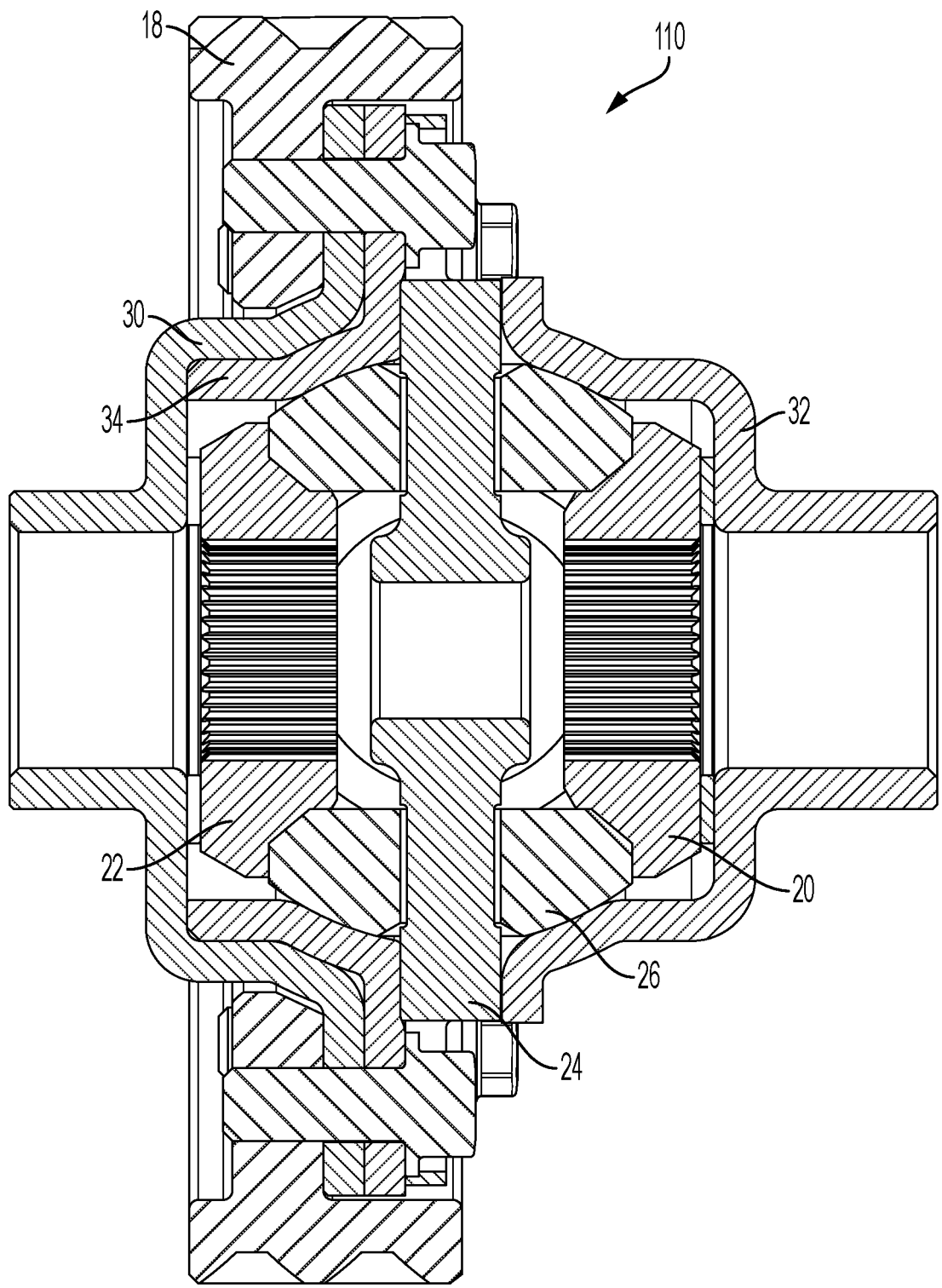
FIG. 11 shows a cross-sectional radially facing view of a differential for motor vehicle drivetrain in accordance with a second example of the present disclosure.
Figure 12:
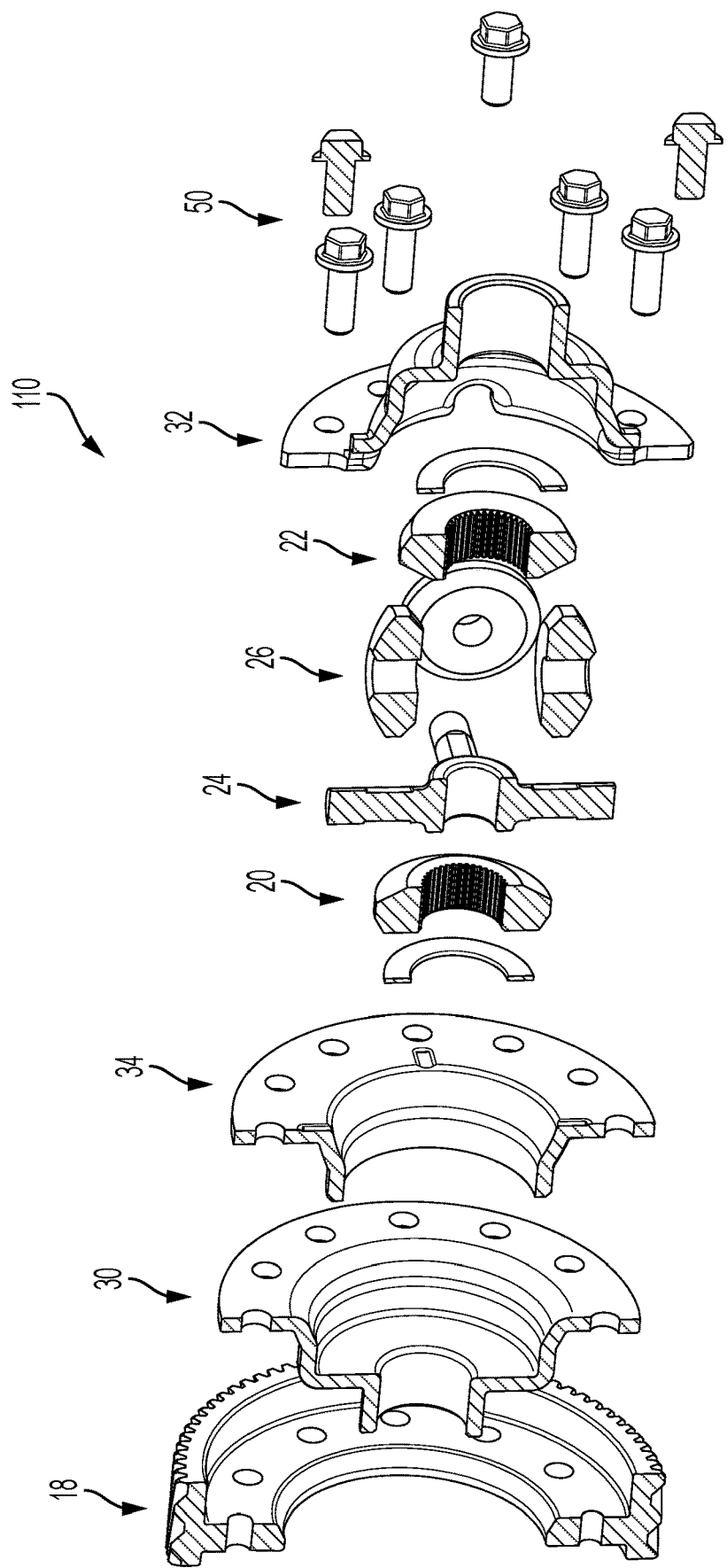
FIG. 12 shows an exploded cross-sectional radially facing view of the differential shown in FIG. 1.

FIGS. 11 and 12 show different views of a differential 110 for motor vehicle drivetrain in accordance with a second example of the present disclosure. Differential 110 is formed in the same manner as differential 10, except for the exclusion of the locking mechanism formed by actuator 42 and locking plate 40.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

REFERENCE NUMERALS 10 differential
12 first axle
14 second axle
16 center axis
18 ring gear
20 first side gear
20a teeth
22 second side gear
24 support pins
26 spider gears
28 carrier
30 first plate
30a radially outer sections
30b axially extending section
30c first radially extending annular section
30d first annular hub
32 second plate
32a radially outer sections
32b section
32c second annular hub
32d outer circumference
34 third plate
34a radially outer sections
34b axially extending section
34c slots
36 radially extending slots
38 radially extending notches
40 locking plate
40a teeth
40b protrusions
42 actuator
44 electric motor
46 actuatable pins
47 bearing
48 holes
49 bearing
50 bolts
110 differential

What is claimed is:

1. A differential for a motor vehicle drivetrain, the differential configured for driving a first axle and a second axle about a center axis and for allowing the first axle and the second axle to rotate about the center axis at different speeds, the differential comprising:
a ring gear configured for receiving a power input;
a first side gear on a first side of the differential configured for being drivingly connected to the first axle to transmit power to the first axle for driving a first wheel of the motor vehicle drivetrain;
a second side gear on a second side of the differential configured for being drivingly connected to the second axle to transmit power to the first axle for driving a second wheel of the motor vehicle drivetrain;
support pins non-rotatably fixed to the ring gear;
spider gears rotatably mounted on the support pins and positioned between the first side gear and the second side gear, each of the spider gears intermeshing with both the first side gear and the second side gear to transmit power from the support pins to the first side gear and the second side gear; and
a carrier formed by stamped plates non-rotatably fixed to the ring gear and configured for transmitting power from the ring gear to the support pins, wherein the stamped plates include a first plate surrounding the first side gear, a second plate surrounding the second side gear and a third plate sandwiched axially between the first plate and the second plate.

2. The differential as recited in claim 1 wherein each of the first, second and third plates includes a radially outer section bolted to the ring gear.

3. The differential as recited in claim 2 wherein each of the first and third plates includes an axially extending section radially inward of the radially outer sections, the axially extending sections extending from the radially outer sections in a direction away from the second side gear.

4. The differential as recited in claim 3 wherein the axially extending section of the first plate extends axially further away from the second side gear than the axially extending section of the third plate.

5. The differential as recited in claim 1 wherein at least one of the stamped plates includes radially extending slots formed therein, each of the support pins extending into a respective one of the radially extending slots.

6. The differential as recited in claim 5 wherein at least the second plate includes the radially extending slots and further includes radially extending notches, each of the radially extending notches being directly radially outside of a respective one of the radially extending slots.

7. The differential as recited in claim 1 further comprising a locking plate for non-rotatably locking the spider gears with respect to the stamped plates and an actuator moving the locking plate between a locking orientation and a non-locking orientation,
the first plate supporting the actuator, the locking plate being housed within the first plate.

8. The differential as recited in claim 7 wherein the actuator includes an electric motor and actuatable pins movable by the electric motor to move the locking plate between the locking orientation and the non-locking orientation,
the first plate including a first radially extending annular section, the actuatable pins being axially movable in holes in the first radially extending annular section.

9. The differential as recited in claim 8 wherein the first plate includes a first annular hub radially inward of the first radially extending annular section, the first annular hub configured for receiving the first axle, the electric motor being provided on an outer circumferential surface of the first annular hub.

10. The differential as recited in claim 8 wherein the second plate extends from the ring gear axially past the second side gear and then radially inward toward the center axis.

11. The differential as recited in claim 10 wherein the third plate includes a radially outer section fixed to the ring gear by bolt passing through the third plate, the third plate further including an axially extending section from an inner end of the radially outer section of the third plate toward the electric motor, the locking plate being axially between an axial end of the axially extending section of the third plate and the first radially extending annular section.

12. The differential as recited in claim 1 wherein each of the stamped plates has a thickness that varies by less than or equal to 20%.

13. A method of constructing the differential as recited in claim 1, the method comprising:
stamping plates to create the stamped plates; and
non-rotatably fixing the stamped plates to the ring gear to form the carrier, the stamped plates encasing the first side gear, the second side gear, the support pins and the spider gears.

14. The method of claim 13 wherein the stamping of the plates includes stamping a first plate and a second plate, the first and second plates encasing the first side gear, the second side gear, the support pins and the spider gears.

15. The method of claim 14 wherein the stamping of the plates includes stamping a third plate, the non-rotatably fixing of the stamped plates to the ring gear to form the carrier including sandwiching a radially outer section of the third plate between a radially outer section of the first plate and a radially outer section of the second plate and passing bolts through all of the radially outer sections and the ring gear,
each of the first and third plates including an axially extending section radially inward of the radially outer sections of the first and third plates, the axially extending sections extending from the radially outer sections of the first and third plates in a direction away from the second side gear,
the axially extending section of the third plate being directly radially outside of the second side gear.

16. The method of claim 13 further comprising installing the spider gears on the support pins; and then
sequentially stacking the second side gear, the spider gears and the first side gear within the first plate; and then
placing the second plate on top of the first side gear; and then
non-rotatably fixing the stamped plates to the ring gear.

17. The method of claim 16 wherein the stamping of the second plate includes machining radially extending notches into an outer circumference of the second plate and then stamping slots into the second plate directly radially inward of the radially extending notches,
the method further comprising installing each of the support pins in a respective one of the slots.

18. The method of claim 16 wherein the placing of the second plate on top of the first side gear includes placing a third plate on top of the support and then placing the first plate on top of the third plate.

\* \* \* \* \*